United States Patent [19]

Lewis et al.

[11] 3,901,006
[45] Aug. 26, 1975

[54] VINE COMBING MACHINE

[75] Inventors: William L. Lewis, S. Cemetry Rd., R.D. No. 4; Mark T. Lewis, R.D. No. 2 Mallick Rd.; Earl C. Clark, all of North East, Pa.

[73] Assignee: said William L. Lewis and said Mark T. Lewis by said Earl C. Clark

[22] Filed: Aug. 13, 1973

[21] Appl. No.: 387,684

[52] U.S. Cl. ................................. 56/330; 56/10.2
[51] Int. Cl.² ......................................... A01D 46/00
[58] Field of Search ............ 56/330, 331, 27.5, 376, 56/10.2

[56] References Cited
UNITED STATES PATENTS

| | | | |
|---|---|---|---|
| 2,635,408 | 4/1953 | Cox | 56/27.5 |
| 2,641,890 | 6/1953 | Baird | 56/33 |
| 2,893,194 | 7/1959 | Lamouria | 56/331 |
| 3,328,944 | 7/1967 | Shepardson | 56/331 |
| 3,603,064 | 9/1971 | Pinkham | 56/27.5 |

Primary Examiner—Russell R. Kinsey

[57] ABSTRACT

A machine for combing vines made up of an endless belt that has fingers extending outward from its path of movement. The fingers penetrate the vines as the belt is drawn along the side of the trellis. The belt is inclined from the front downward so that as the belt is moved forward, the vines hold each finger against forward movement and the finger is forced to move through the vines from the top toward the bottom to give a combing action. The belt may be carried by a vehicle such as a farm tractor and a hydraulic system is provided to maintain the frame in the proper relation to the trellis wire. Rods, suspended from a frame, engage the side of the trellis remote from the tractor and hold the vines toward the belt. The belt may be inclined at an acute angle to the direction of travel of the tractor so that the front part will not dig into the vines.

22 Claims, 10 Drawing Figures

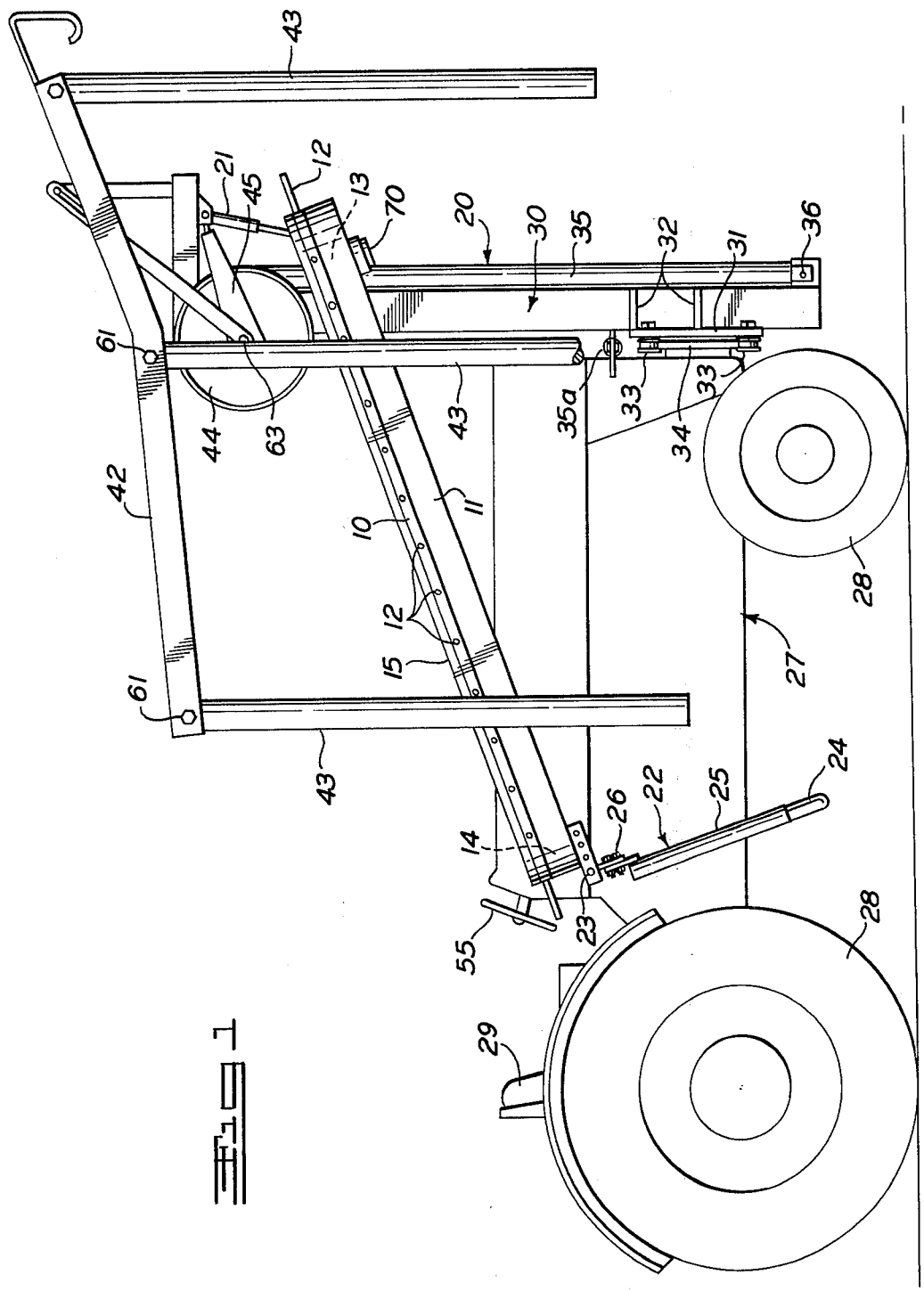

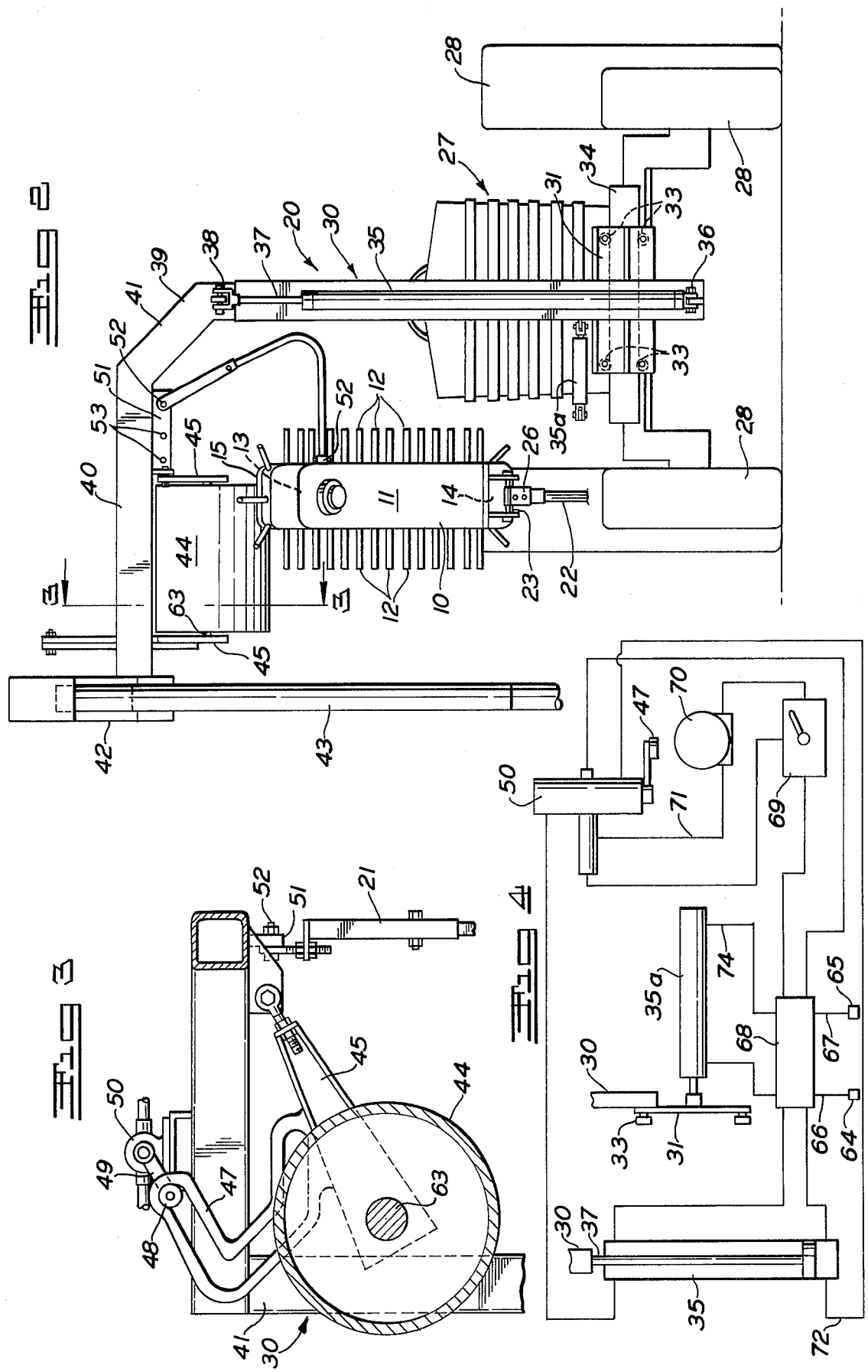

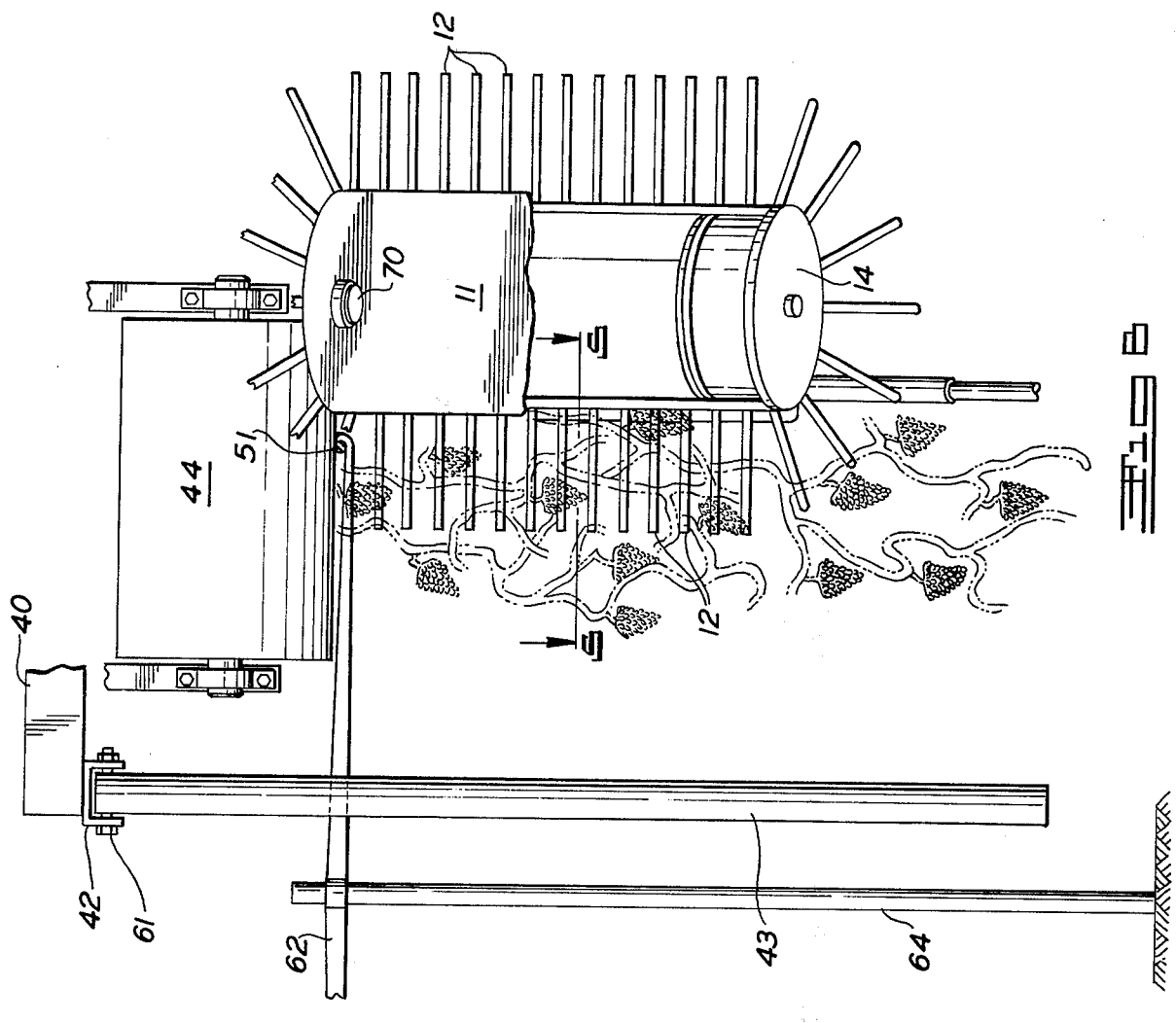
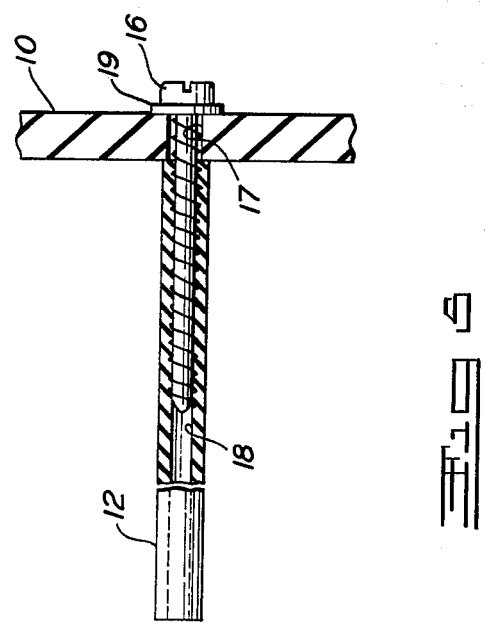

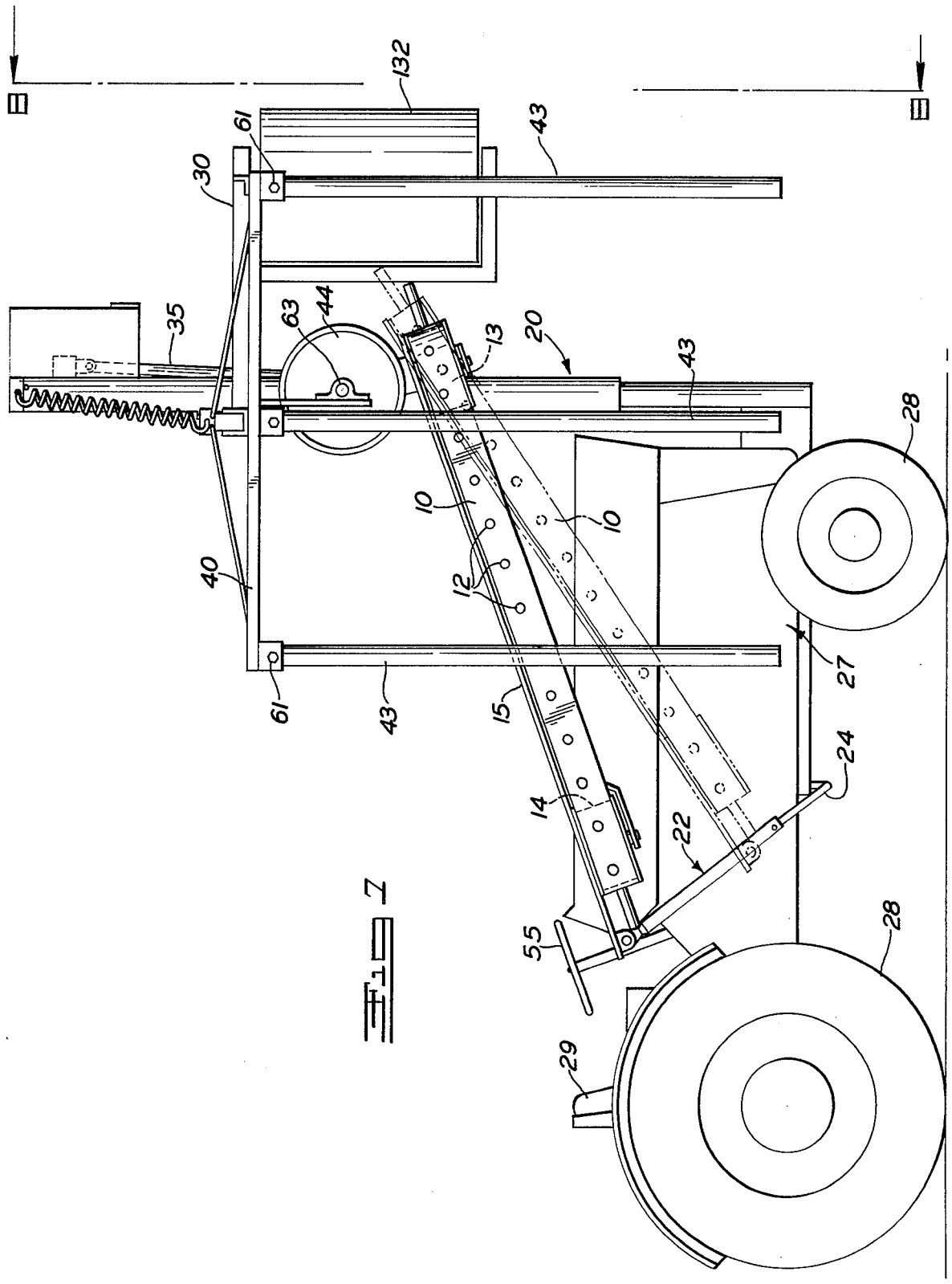

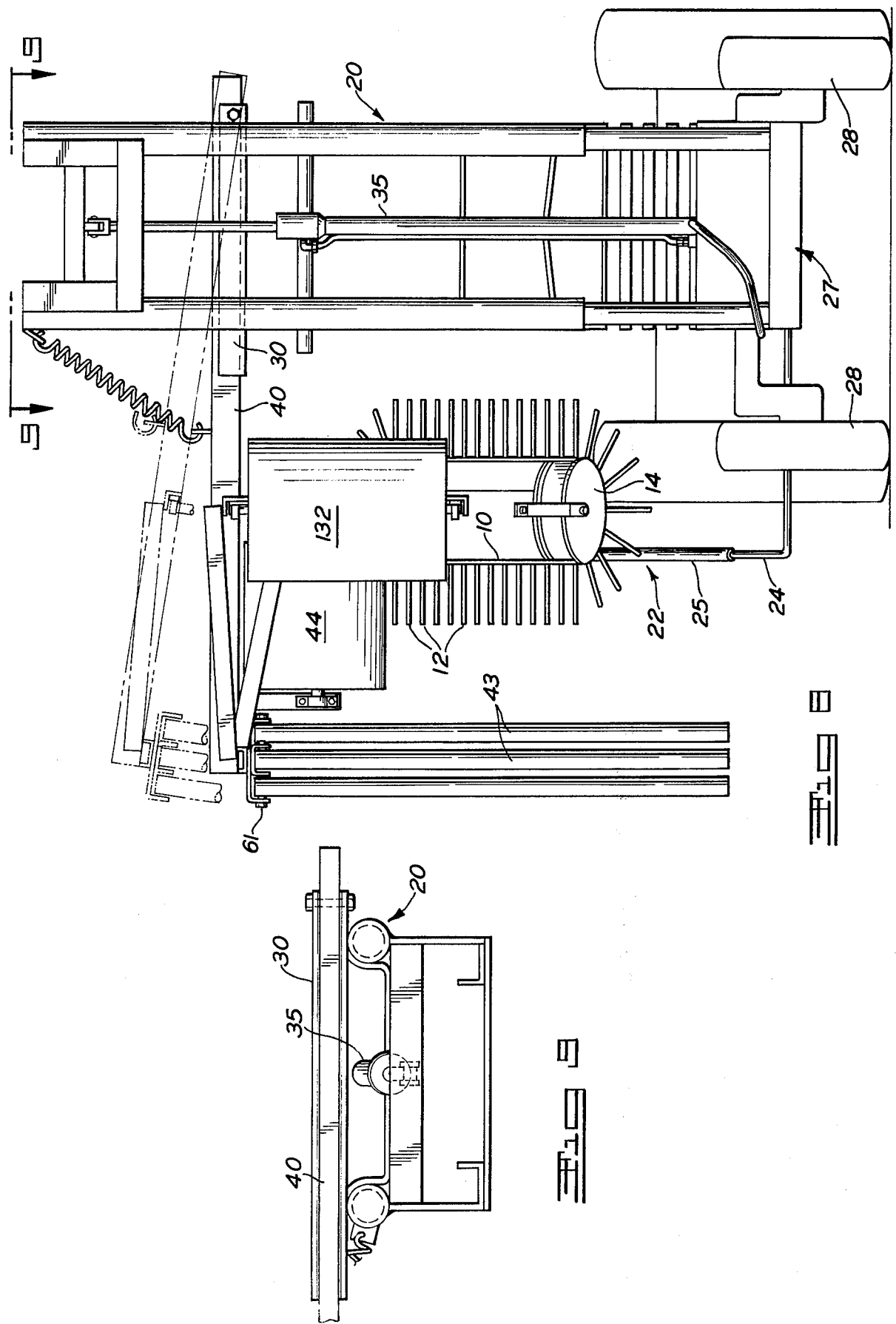

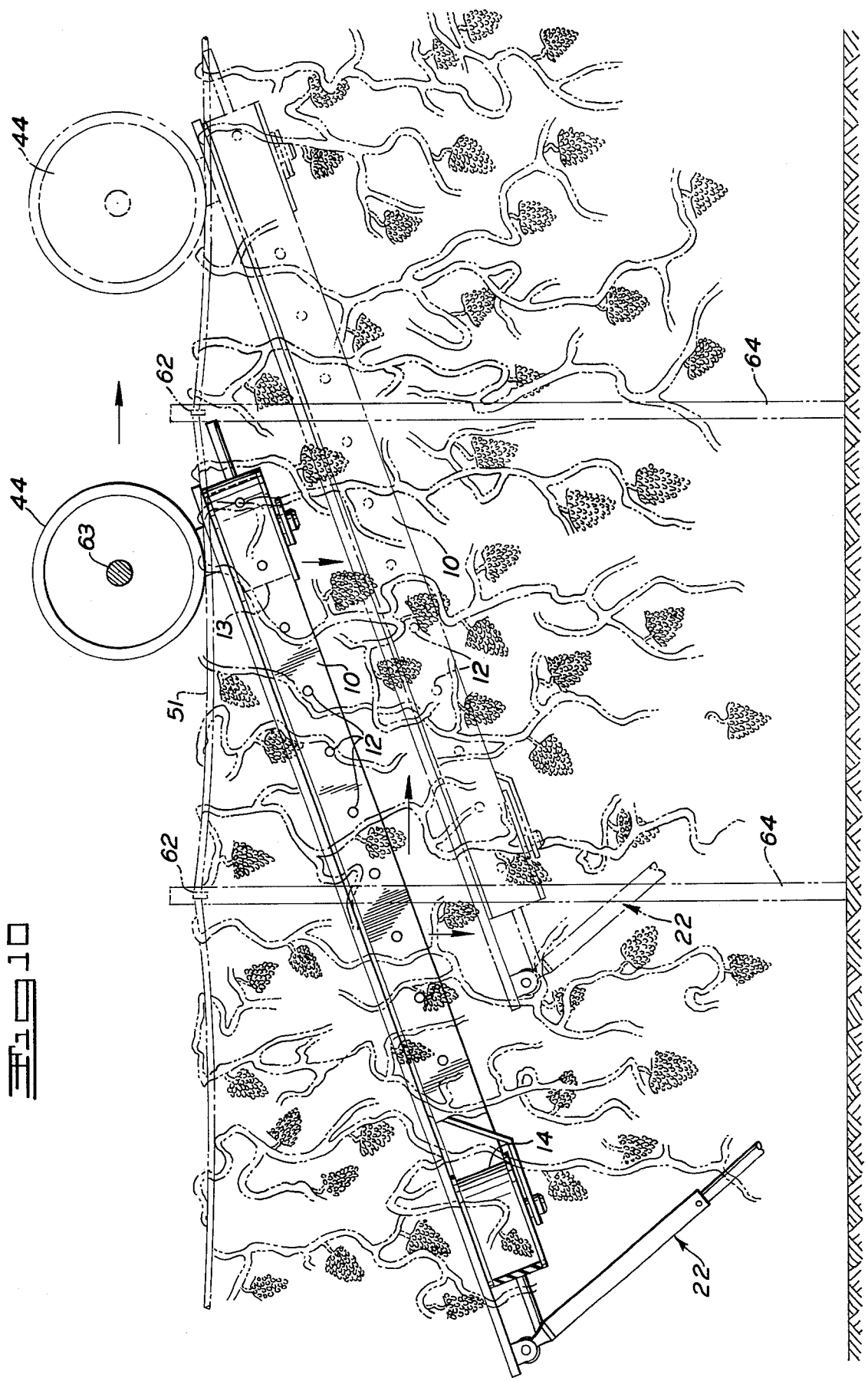

VINE COMBING MACHINE

REFERENCE TO PRIOR ART

The machine disclosed constitutes an improvement over the machines shown in the following patents:
U.S. Pat. No. 3,490,217
U.S. Pat. No. 3,277,605
U.S. Pat. No. 3,151,431
U.S. Pat. No. 2,611,215
U.S. Pat. No. 2,865,135
U.S. Pat. No. 1,265,244

OBJECTS OF THE INVENTION

It is an object of the invention to provide an improved grape vine combing machine.

Another object of the invention is to provide a grape vine combing machine that is simple in construction, economical to manufacture, and simple and efficient to use.

Another object of the invention is to provide a grape vine combing machine made up of a belt supported on free wheeling pulleys supported above each other and spaced from each other in the direction of travel of the vehicle so that the fingers penetrate grape vines as the vehicle moves along the trellis and combs the vines vertically.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 1 is a side view of the vine combing machine according to the invention.

FIG. 2 is a front view of the machine shown in FIG. 1.

FIG. 3 is a cross sectional view taken on line 3—3 of FIG. 2.

FIG. 4 is a hydraulic circuit for the machine.

FIG. 5 is an enlarged cross sectional partial view of the belt and one of the fingers taken on line 5—5 of FIG. 6.

FIG. 6 is an enlarged front view of the machine.

FIG. 7 is a side view of another embodiment of the invention.

FIG. 8 is a front view of the embodiment shown in FIG. 7.

FIG. 9 is a top view of the embodiment shown in FIG. 8.

FIG. 10 is a schematic view of the machine shown working on a trellis.

DETAILED DESCRIPTION OF THE DRAWINGS

Now with more particular reference to the drawings, the belt 10 is shown supported on the carrier frame 11. The belt 10 has fingers 12 that extend outwardly generally perpendicular to the direction of travel of the belt 10. The belt is supported on the front pulley 13 and the rear pulley 14. A cover 15 is provided over top of the belt and the fingers 12 extend out through the space between the cover and the belt frame. The front end of the belt frame is carried on the main frame 20 by the arm 21 and the rear end of the belt frame 11 is carried on the vehicle by the arm 22 to move in a path around pulleys 13 and 14.

The arm 22 is pivotally connected to the belt frame by the bolt 23. The arm 22 is generally L-shaped and the lower part 24 is fixed at its inner end to the underside of the tractor 27. The vertical part of the L-shaped arm 22 is telescopically received in the tubular member 25. The upper end of the tubular member is fixed to the bracket 26 which receives the bolt 23.

The front part of the main frame 20 is made up of the column 30. The column 30 is fixed at its lower end to the plate 31 by means of gusset plate 32. The plate 31 has the four rollers 33. The plate 34 is fixed to the frame of the tractor and it has parallel top and bottom edges on which the rollers 33 run.

The hydraulic cylinder 35 is pivoted to the lower end of the column 30 at 36 and the cylinder 35 has a piston and piston rod 37 connected by bolt 38 to the telescopic column member 39. The telescopic column member 39 has a laterally extending arm 40 connected to it by the inclined part 41. The distal end of the laterally extending arm 40 has the axially extending arm 42 connected to it and the rods 43 are suspended from the axially extending arm 42.

The pilot roller 44 is swingably supported on the arm 40 by the links 45 and the cam member 47 is fixed to the links 45 and extends upwardly and has a cam slot that receives the roller 48 which is connected to the actuating arm 49 of the valve 50 as the roller 44 swings up and down as it follows the catenary of the trellis wire 51, the valve 50 directs oil to the space in cylinder 35 below its piston and the piston will be forced upward, raising the entire frame that is connected to the arm 38. This includes the front end of the belt frame 11, and the axially extending arm 42 that carries the suspended rods 43.

The front end of the belt frame is supported on the arm 40 by the L-shaped arm 21. The L-shaped 21 has its upper end pivoted to the bracket 51 by pivot 52. The pivot 52 may be moved to any one of the holes 53 to adjust the front end of the belt frame toward and away from the trellis. Thus the front end of the belt frame can be inclined at an acute angle relative to the longitudinal axis and direction of travel of the tractor so that the front end of the belt will not tend to dig into the grape trellis. The lower end of the arm 21 is pivoted to the belt frame 11 at 52.

The roller 44 is supported on arm 40 by its axles 63 and the roller freely rotates on these axles. The function of the roller 44 is to control the valve 50 and thus control the vertical position of the front end of the belt frame and the top of the rods 43.

The rods 43 are swingably supported on the arm 42 by pivots 61. Thus the rods 43 can swing from front to back but are restrained against swinging laterally. This enables the rods to swing rearwardly to clear obstructions as, for example, to clear the arms 62 that are fixed to the trellis posts 64. The trellis may be of the type known in the trade as the "double-curtain Geneva" type trellis, or it could be any other suitable type of trellis.

The fingers 12 may be made of pieces of hydraulic hose that has a metal shield woven into it that renders it relatively rigid and the hose may be supported on the belt 10 by means of lag bolts 16 which extend through holes 17 in the belt and threadably engage the opening 18 through the holes. The lag bolt may be proportioned to the proper length to give the hose the proper degree of rigidity. A suitable washer 19 may be placed under the head of the leg bolt 16.

The hydraulic circuit shown in FIG. 4 is suitable to be attached to the ordinary pressure oil system of a farm tractor or the like. The pressure connection 64 and the return connection 65 will be connected to the proper connections of the hydraulic system of the tractor and they will be connected through the lines 66 and 67 to the manual double-valve 68. The manual double-valve will be connected as shown to the selector valve 69 which will connect oil under pressure to the motor 70 and through the motor 70 through line 71 to the roller controlled valve 50. Oil will be connected from the roller valve 50 through line 72 to the underside of the hydraulic cylinder 35 for moving the column 30 up and down to follow the catenary of the trellis wire sag. The oil will likewise be connected from manual double-valve 68 to cylinder 35a by way of lines 74. Thus the roller 47 will control the position of the piston rod 37 and cylinder 35 and the manual valve 68 will control the lateral position of the frame supporting the belt and the rods. A hydraulic motor 70 is connected to the front pulley 13. The hydraulic motor 70 drives the belt 10 at a linear speed equal to the speed of the forward movement of the tractor so that when the fingers 12 penetrate the vines of the trellis, the belt will be driven at such a speed that as the tractor moves forward, there will be no relative movement between the belt and the vines. This compensates for open spaces in the vines and eliminates belt slippage relative to the vines which might occur if the motor were not in place. The motor 70 is so arranged so that it free wheels in the reverse direction so that a person can grasp the fingers 12 when the belt is not entered into the vines and can push the belt rearward.

The tractor shown indicated at 27 has wheels 28, a seat 29, and steering wheel 55.

In the embodiment of the invention shown in FIGS. 7–9, the machine shown is essentially like that shown in the first embodiment of the invention. However, in the second embodiment, the machine has a lateral guide roller 132 supported from the frame 30 and has the rods 43 suspended from a swinging frame 40. The machine, in both embodiments, is intended to operate basically the same, that is, they each have the continuous belt with the fingers which penetrate the vines and have an up and down combing action relative to the vines.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A machine for combing vines, said machine comprising an endless belt,
    belt frame means supporting said endless belt for movement along said vines in a path,
    fingers supported on said belt and extending outwardly therefrom,
    said fingers being adapted to penetrate said vines,
    said belt being supported to move in said path at an acute angle to said vines whereby said fingers entering said vine have no forward motion but move relative to said vines, giving a combing action to said vines and trellis engaging means on said belt frame means, hydraulic pressure means connected to said trellis engaging means and valve means connected to said hydraulic pressure means and to said belt frame means for connecting fluid under pressure to said hydraulic pressure means whereby the angle of said belt frame means relative to said trellis is controlled.

2. The machine recited in claim 1 wherein a motor is connected to said belt,
    said motor driving said belt at a speed equal to the speed of said means supporting said belt along said vines.

3. The machine recited in claim 2 wherein said motor is a hydraulic motor,
    and said belt free wheels on said motor in a direction opposite to the movement of said belt.

4. The machine recited in claim 1 wherein said means supporting said belt comprises a vehicle,
    and said belt is carried on a frame,
    said frame is swingably supported on said vehicle whereby said frame can move toward and away from said vines.

5. The machine recited in claim 4 wherein means is provided for raising and lowering the front end of said belt relative to said vehicle whereby the angle of said belt changes.

6. The machine recited in claim 5 wherein said belt is fixed at the front end and is supported by the same frame at the front end as it is at the rear end whereby the angle of said belt relative to said vines can be changed.

7. The machine recited in claim 6 wherein means is provided for automatically adjusting the front end of said belt whereby said belt can be adjusted upward and downward relative to said vines while maintaining the acute angle of said belt to said vines.

8. The machine recited in claim 7 wherein means is provided for maintaining said belt at an acute angle to the direction of travel of said vehicle,
    and means is provided for adjusting said angle relative to said direction of travel of said vehicle.

9. A machine for combing vines, said machine comprising an endless belt,
    means supporting said endless belt for movement along said vines in a path,
    fingers supported on said belt and extending outwardly therefrom,
    said fingers being adapted to penetrate said vines,
    said belt being supported to move in said path at an acute angle to said vines whereby said finger entering said vine has no forward motion but moves relative to said vines, for combing said vines, rods (are) suspended from said frame,
    said rods being adapted to extend downwardly on the side of said vine remote from said belt whereby said vines are urged toward said belt.

10. The machine recited in claim 9 wherein said rods are pivotally supported whereby said rods can swing rearwardly to clear obstructions.

11. A machine for combing grape vines comprising a tractor,
    a column supported on the front of said tractor, laterally extending arm,
a belt frame supported on said arm, a continuous belt supported on said belt frame,
a roller supported on said machine and adapted to roll along the top of a trellis wire,
an automatic valve,
actuating means on said roller for actuating said automatic valve,
a vertical hydraulic cylinder connected to said column,
means connecting said vertical hydraulic cylinder to said automatic valve whereby said cylinder adjusts the front end of said valve relative to said vines,
and means on said tractor supporting the rear end of said belt frame,
said belt having fingers thereon extending perpendicular to the travel of said tractor whereby as said tractor moves forward, said fingers penetrate said vines and move upward and then downward in said vines relative to said vines.

12. The machine recited in claim 11 wherein means is provided for slidably supporting said column on said tractor and a second hydraulic cylinder is connected to said tractor and to said column,
and hydraulic means is connected to said second cylinder for laterally adjusting the position of said column.

13. The machine recited in claim 11 wherein said front end of said belt supporting frame is supported on an L-shaped arm,
the upper end of said L-shaped arm being supported on said column,
and the lower end of said L-shaped arm being pivotally attached to said belt supporting frame,
and means to adjust the position of pivot of said upper end of said L-shaped arm, whereby the angle of said belt supporting frame relative to the direction of travel of said tractor can be adjusted.

14. The machine recited in claim 13 wherein means is provided to adjust the rear end of said belt supporting frame whereby the angle of said fingers relative to the vertical plane of said trellis can be adjusted.

15. The machine recited in claim 1 wherein said means to support said belt comprises means to tilt said fingers adjacent said vines downward and toward said vines whereby said vines tend to be retained on said fingers as said fingers move through said vines.

16. The machine recited in claim 1 wherein means is provided to adjust said belt supporting frame up and down at a relative constant angle relative to a horizontal.

17. The machine recited in claim 1 wherein means is provided to drive said belt in said path to move said fingers on the side of said belt adjacent said vines in a direction opposite to the direction of travel of said vehicle,
said belt being free to move said fingers in a direction opposite the direction of travel of said vehicle.

18. The machine recited in claim 1 wherein the front end of said frame is supported on said vehicle to swing generally perpendicular to the direction of travel of said vehicle.

19. The machine recited in claim 1 wherein means is provided to raise and to lower the front end of said frame whereby the angle of said frame relative to the horizontal is adjusted.

20. The machine recited in claim 1 wherein said fingers are made of a relatively rigid material on the end thereof adjacent said belt whereby the ends of said fingers may flex relative to said vines.

21. The machine recited in claim 1 wherein said fingers are made of a relatively stiff hose made of resilient material,
said fingers are attached to said belt by a rigid member passing through said belt and engaging the interior of said material.

22. A machine for combing vines comprising
a vehicle adapted to move alongside a row of vines,
fingers supported on said machine and adapted to extend into said row of vines,
said fingers when extending into said row of vines being restrained to move in a path being disposed at an acute angle relative to the direction of travel of said vehicle,
each of said fingers being adapted to move generally vertical relative to said row of vines whereby said vines combed,
trellis engaging means connected to said finger support for adjusting said fingers up and down relative to the top of a trellis means for actuating said trellis adjusting means.

* * * * *